US010216859B2

(12) United States Patent
Tung

(10) Patent No.: US 10,216,859 B2
(45) Date of Patent: Feb. 26, 2019

(54) HANDLING USER INTERFACE COMPONENTS

(71) Applicant: Facebook, Inc., Menlo Park, CA (US)

(72) Inventor: Yen-Ting Tung, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 416 days.

(21) Appl. No.: 15/077,706

(22) Filed: Mar. 22, 2016

(65) Prior Publication Data

US 2017/0279919 A1 Sep. 28, 2017

(51) Int. Cl.
*G06F 17/30* (2006.01)
*G06T 11/20* (2006.01)
*G06F 9/451* (2018.01)
*H04L 29/08* (2006.01)
*G06F 9/44* (2018.01)

(52) U.S. Cl.
CPC ...... *G06F 17/30958* (2013.01); *G06F 9/4443* (2013.01); *G06F 9/451* (2018.02); *G06F 17/30554* (2013.01); *G06F 17/30598* (2013.01); *G06T 11/206* (2013.01); *H04L 67/02* (2013.01); *H04L 67/36* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,195,717 B2* | 11/2015 | Miller | | G06F 17/30017 |
| 9,684,741 B2* | 6/2017 | Li | | G06F 17/30991 |
| 2009/0144264 A1* | 6/2009 | Singh | | G06F 17/30867 |
| 2010/0010989 A1* | 1/2010 | Li | | G06F 17/273 |
| | | | | 707/E17.017 |
| 2012/0005224 A1* | 1/2012 | Ahrens | | H04W 4/21 |
| | | | | 707/769 |
| 2013/0018957 A1* | 1/2013 | Parnaby | | G06Q 10/10 |
| | | | | 709/204 |
| 2013/0066673 A1* | 3/2013 | Rose | | G06F 3/048 |
| | | | | 705/7.28 |
| 2013/0067364 A1* | 3/2013 | Berntson | | G06F 3/048 |
| | | | | 715/764 |
| 2013/0073582 A1* | 3/2013 | Krishnamoorthy | | |
| | | | | G06F 17/30867 |
| | | | | 707/769 |
| 2013/0191416 A1* | 7/2013 | Lee | | G06F 17/30979 |
| | | | | 707/771 |
| 2014/0156626 A1* | 6/2014 | Salvetti | | G06F 17/30864 |
| | | | | 707/709 |

(Continued)

*Primary Examiner* — Hien L Duong
(74) *Attorney, Agent, or Firm* — Baker Botts L.L.P.

(57) ABSTRACT

In one embodiment, a method includes by a client computing device, sending a request for two or more categories of content for display in a user interface, wherein each of the categories of content are received from a different content source, and wherein each of the categories of content are displayed in a corresponding region of the user interface. The method further includes determining a space requirement for each of the categories of content, wherein the determining is based at least in part on information in the request and information stored on the client computing device. The method further includes allocating, based on the space requirements, space for each of the regions of the user interface, and displaying each of the categories of content in its corresponding region as the content is received.

19 Claims, 16 Drawing Sheets

(56) References Cited

U.S. PATENT DOCUMENTS

| | | | |
|---|---|---|---|
| 2014/0214822 A1* | 7/2014 | Sinha | G06F 17/3053 707/731 |
| 2014/0229461 A1* | 8/2014 | Cohen | G06F 17/30598 707/706 |
| 2014/0280017 A1* | 9/2014 | Indarapu | G06F 17/30864 707/711 |
| 2016/0092518 A1* | 3/2016 | Grabar | G06F 17/30241 707/724 |

* cited by examiner

HANDLING USER INTERFACE COMPONENTS

TECHNICAL FIELD

This disclosure generally relates to handling user interface components on a client device.

BACKGROUND

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

The present invention provides a method and system for allocating space on a display screen to properly load user interface components. When a UI component is populated with groups of items from sources with varying latencies, the items may appear on the display screen at different times. If a first group of items is the fastest to be retrieved and displayed on the screen, but the first group is intended to be positioned below a second group of items that has not yet been retrieved and displayed, the first group may appear to jump once or repeatedly in a jerky manner down the screen while the slower second group of items is being retrieved and displayed above the first group of items. This detracts from the user experience because items on the screen may shift without input from the user.

To overcome the above described problem, part of the display screen may be pre-allocated for groups of entries that load more slowly but are intended to appear higher on the screen. Items that appear before these high priority items may be positioned lower, outside of the pre-allocated region. In this way, items remain on the screen where they are originally displayed. The size of the pre-allocated region may be determined by one or more machine learning algorithms, which will be discussed herein.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Particular embodiments described herein provide a method and system for allocating space on a display screen to properly load user interface components by pre-allocating a region for items based on one or more machine learning algorithms. When a UI component (e.g., a display screen on a client device) is populated with groups of items from sources with varying latencies, if the first group of items is the fastest to be retrieved and displayed on the screen, but the first group is intended to be positioned below a second group of items that has not yet been retrieved and displayed, the first group may appear to jump once or repeatedly in a jerky manner down the screen while the slower second group of items is being retrieved and displayed above the first group of items. This issue may arise in any situation where a list, array, or other arrangement of items is retrieved from heterogeneous sources, but particularly detracts from the user experience when the first group of items comprises links that the user would like to select. The first group may be displayed before the second group, and as the user moves her cursor or hand in an attempt to click or tap on an item in the first group, the first group of items may unexpectedly jump down the screen to make room for the second group of items, which appears in the same location that the first group of items were previously located. This may cause the user to unintentionally select an item from the second group, which the user may find particularly annoying.

By way of example and not limitation, this problem may occur in the context of search engines that employ a typeahead feature in the search engine's search bar. As a user types in a search query, certain types of items may load faster than others. Usually, a group of references to users or entities (an "entities list group") loads faster than a group of references to keywords and posts (a "keywords list group"). An entities list group may comprise users and other entities to which the user has a first or second degree connection. A keywords list group may comprise references to posts, trending stories, celebrities, etc. Items in the entities list group may initially be retrieved and displayed at the top of the screen (just below the search bar). After a brief delay, the keywords list group may be retrieved and displayed. The keyword list group may intentionally be placed higher than the entities list group. Because the keyword list group is placed higher, the entities list group is pushed down on the display screen. The different load times cause the items in the entities list group (which appeared first) to jump around on the screen while items in the keyword list group are being displayed more slowly. This may annoy users because items on the screen may shift without input from the user.

Figure 1A:
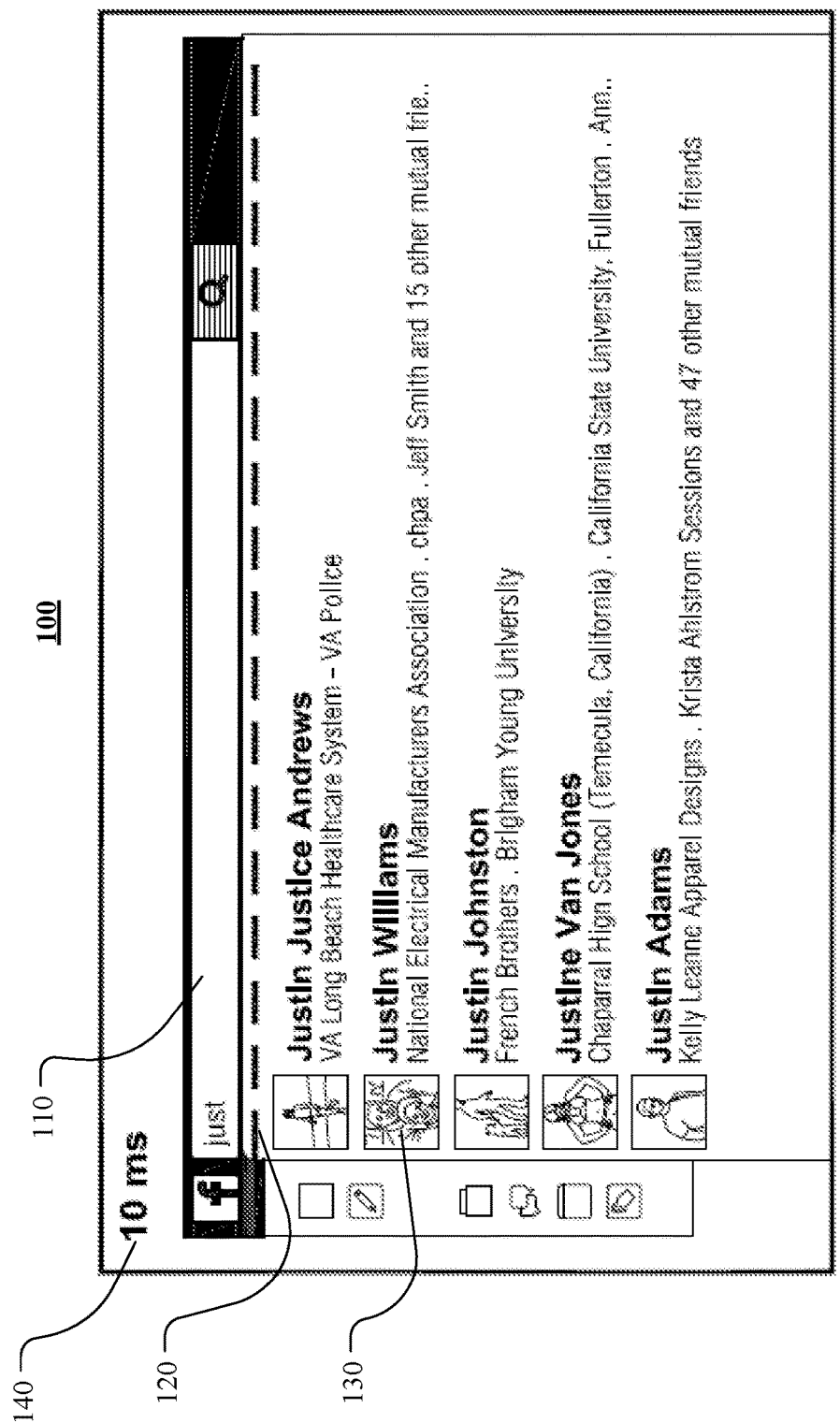
FIGS. 1A-D illustrate a first example user interface with groups of items from sources with varying latencies.
Figure 1B:
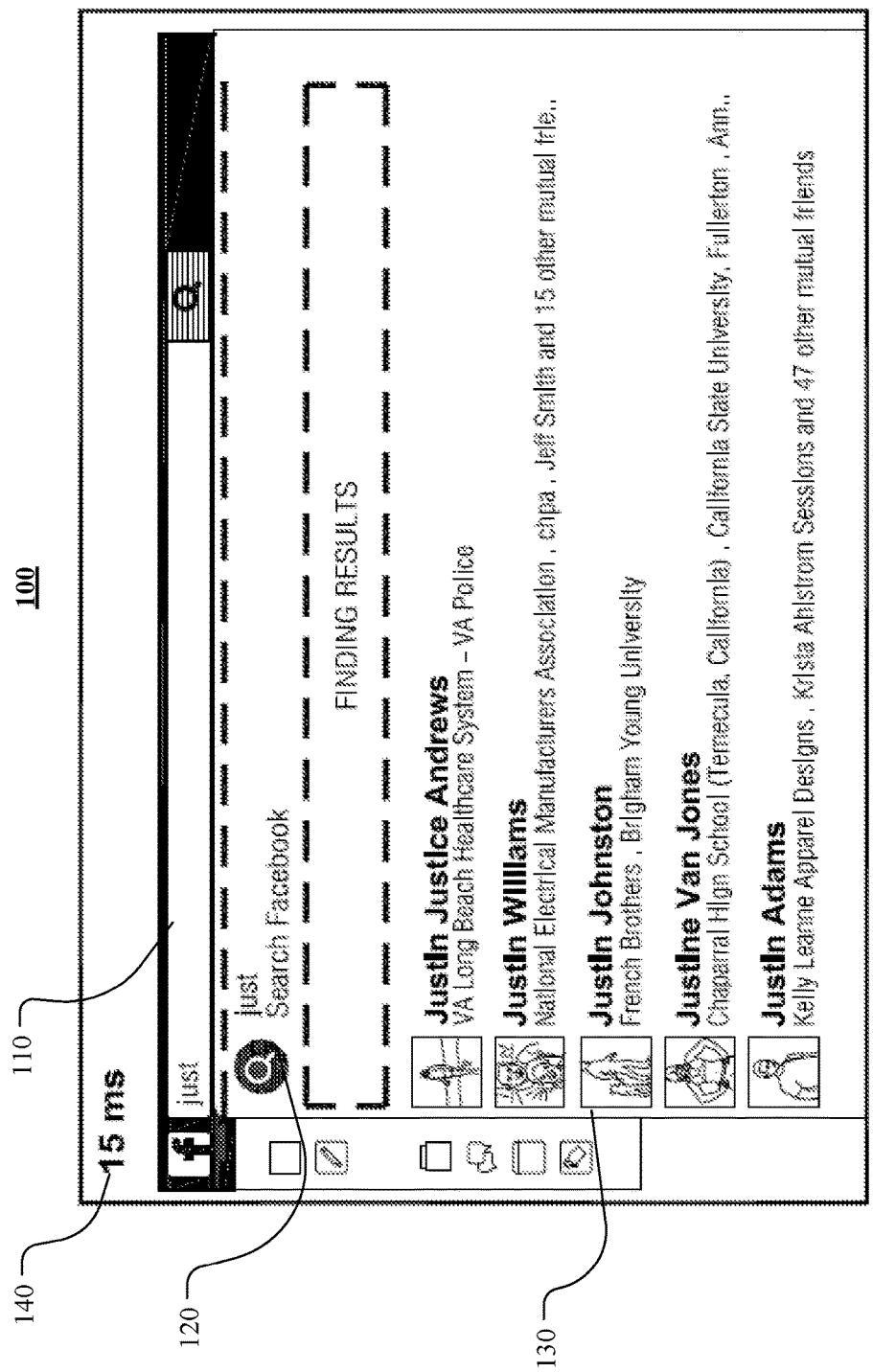
Figure 1C:
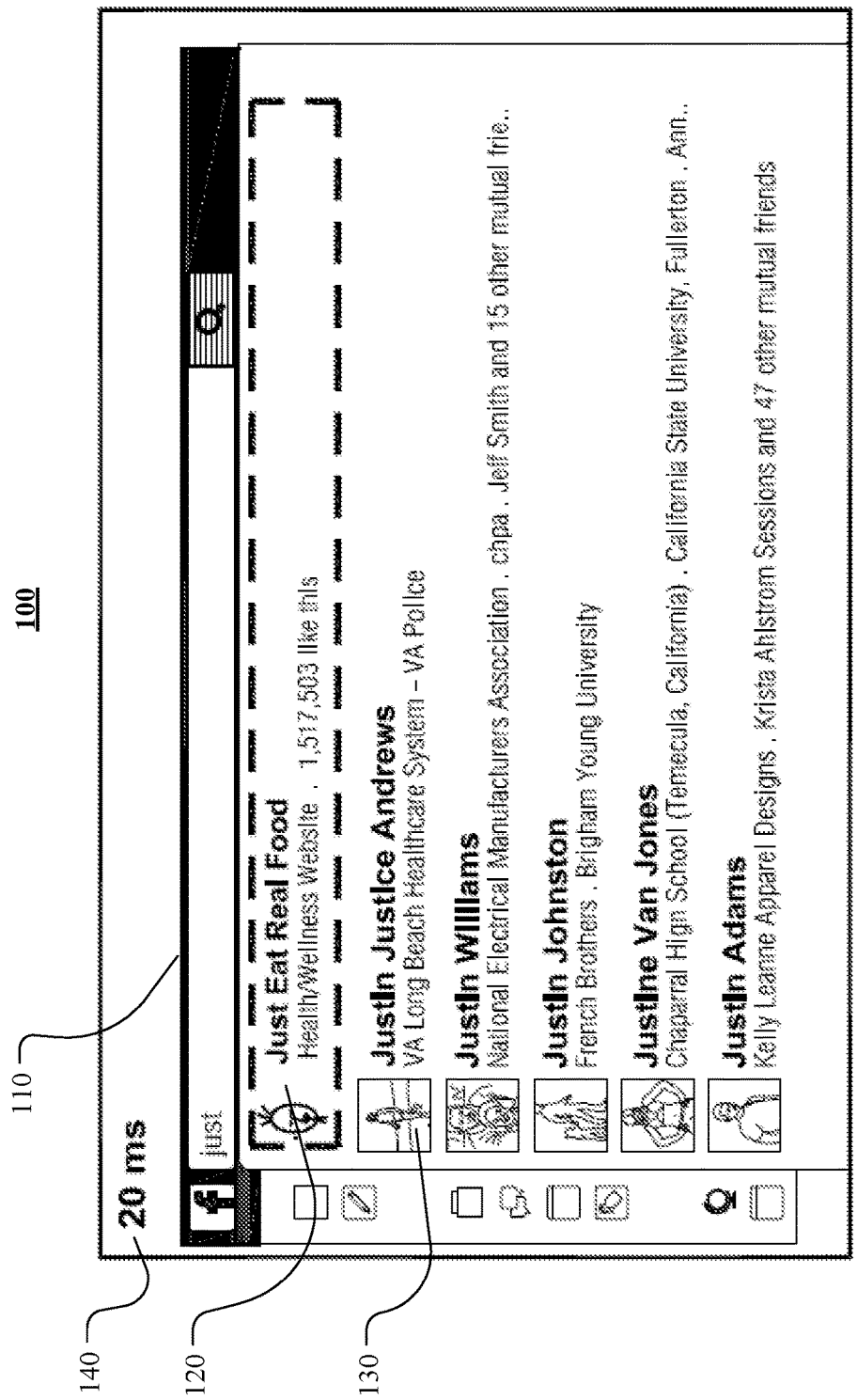
Figure 1D:
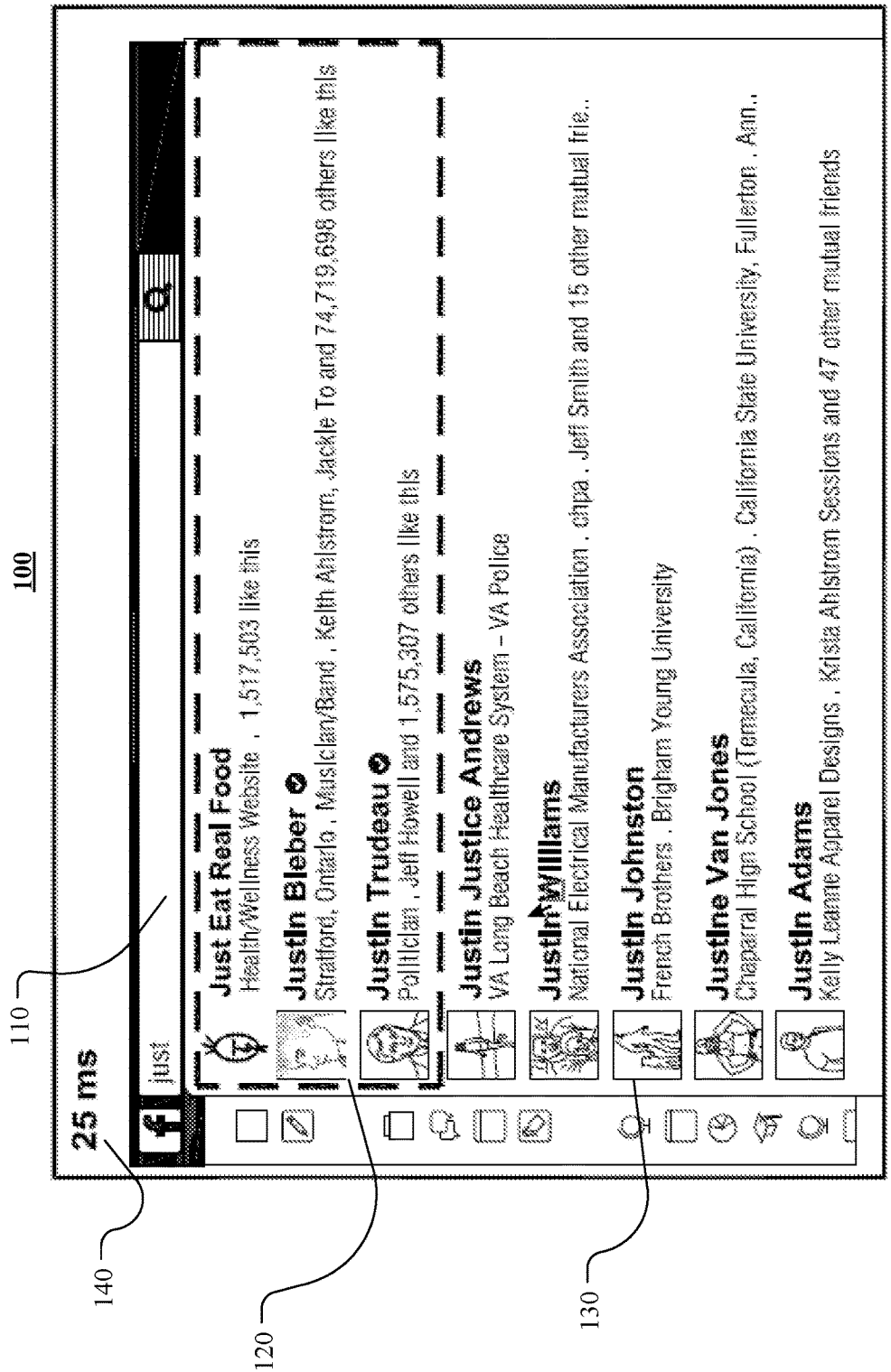

FIGS. 1A-D illustrate the above described problem. FIGS. 1A-D illustrate a first example user interface with groups of items from sources with varying latencies. FIGS. 1A-D may be thought of as four screen shots taken over a short period of time (e.g., at 10 milliseconds (ms), 15 ms, 20 ms, and 25 ms). A user interface 100 is shown, which includes a search bar 110, an upper region 120, and a lower region 130. There is also a time element 140, which is for illustrative purposes only, to illustrate the time lapse between each screen shot. At time t=0, a user may enter a query into search bar 110. As an example and not by way of limitation, a user may enter the character string, "just" into search bar 110, as shown in FIG. 1A. The string "just" may only the beginning to a phrase the user wishes to enter. For example, "just" may be the beginning of the phrase "justin bieber," or "just desserts," or any number of phrases that begin with the string "just." A typeahead engine may attempt to predict what the user intends to type by searching several databases and returning one or more references to entities or content objects that are associated with the string "just." This typeahead engine may search on different databases with different latencies—a first database may be easier or faster to search than a second database. Thus, the typeahead engine may return entries from the first database before entries from the second database. As an example and not by way of limitation, the typeahead feature may initially return an entities list group comprising a list of references to the user's friends that have "Just" in their names (e.g., "Justin Justice Andrews," "Justin Williams," "Justin Johnston," "Justine Van Jones" etc.). The entities list group may appear on the screen first in the lower region 130. However, they may initially be being positioned at the top of the screen just under the search bar. This may be because the items in the entities list group may originate from a source that has a faster latency than other sources. It is important to node, that the upper region 130 may initially be represented as a dotted line. This may be because space for upper region 130 has not been allocated yet, and may not be allocated until items designated for that region are retrieved and displayed on the user interface. FIG. 1B illustrates that after a brief delay (e.g., 5 ms), the upper region 120 may grow in size, and text may appear directly under the search bar. The text may state, "Finding Results" or some similar statement. Notice that the items in the lower region 130 have been pushed down to make room for the expanding upper region 120. FIG. 1C illustrates that after another brief delay (e.g., 5 more milliseconds), one or more items on a keyword list group may be retrieved and displayed on the screen in the upper region 120. The keywords list group in the above example may comprise references to any entity or content object, including, but not limited to celebrities, companies, schools, places, musical groups, etc. As an example and not by way of limitation, upper region 120 may be initially populated with a reference to a business called "Just Eat Real Food." Other items in the entities list group intended to be displayed in upper region 120 may include references to Justin Bieber, a famous celebrity, or Justin Trudeau, who is a politician. FIG. 1D illustrates that after another brief delay (e.g., 5 more milliseconds) the upper region 120 has been populated by three items from the keywords list group: Just Eat Real Food, Justin Bieber, and Justin Trudeau. The keyword list group may be intended to be positioned above the entities list group, in upper region 120. Therefore, the references to items in the entities list group (e.g., "Justin Justice Andrews," "Justin Williams," "Justin Johnston," "Justine Van Jones" etc.) may need to move down on the screen to make room for the references to Just Eat Real Food, Justin Bieber, and Justin Trudeau. It is important to note, that as depicted in FIGS. 1A-D, the upper region 120 expands as time progresses, and the lower region 130 shifts down to make room for the upper region 120. It is this shifting down that is to be avoided. An object of this disclosure is that once items load on the screen, they do not move without input from the user.

Figure 2A:
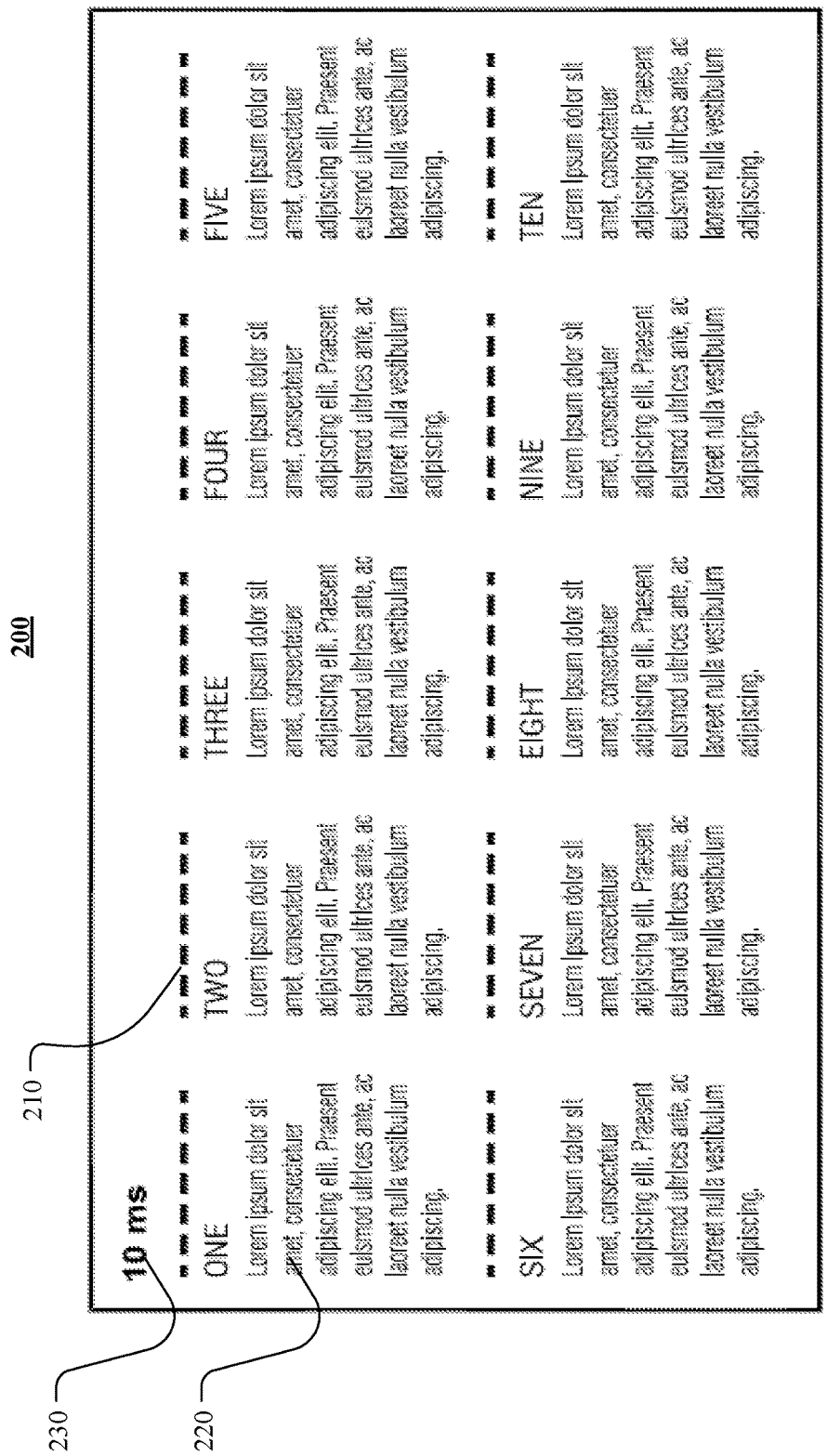
FIGS. 2A-D illustrate a second example user interface with groups of items from sources with varying latencies.
Figure 2B:
Figure 2C:
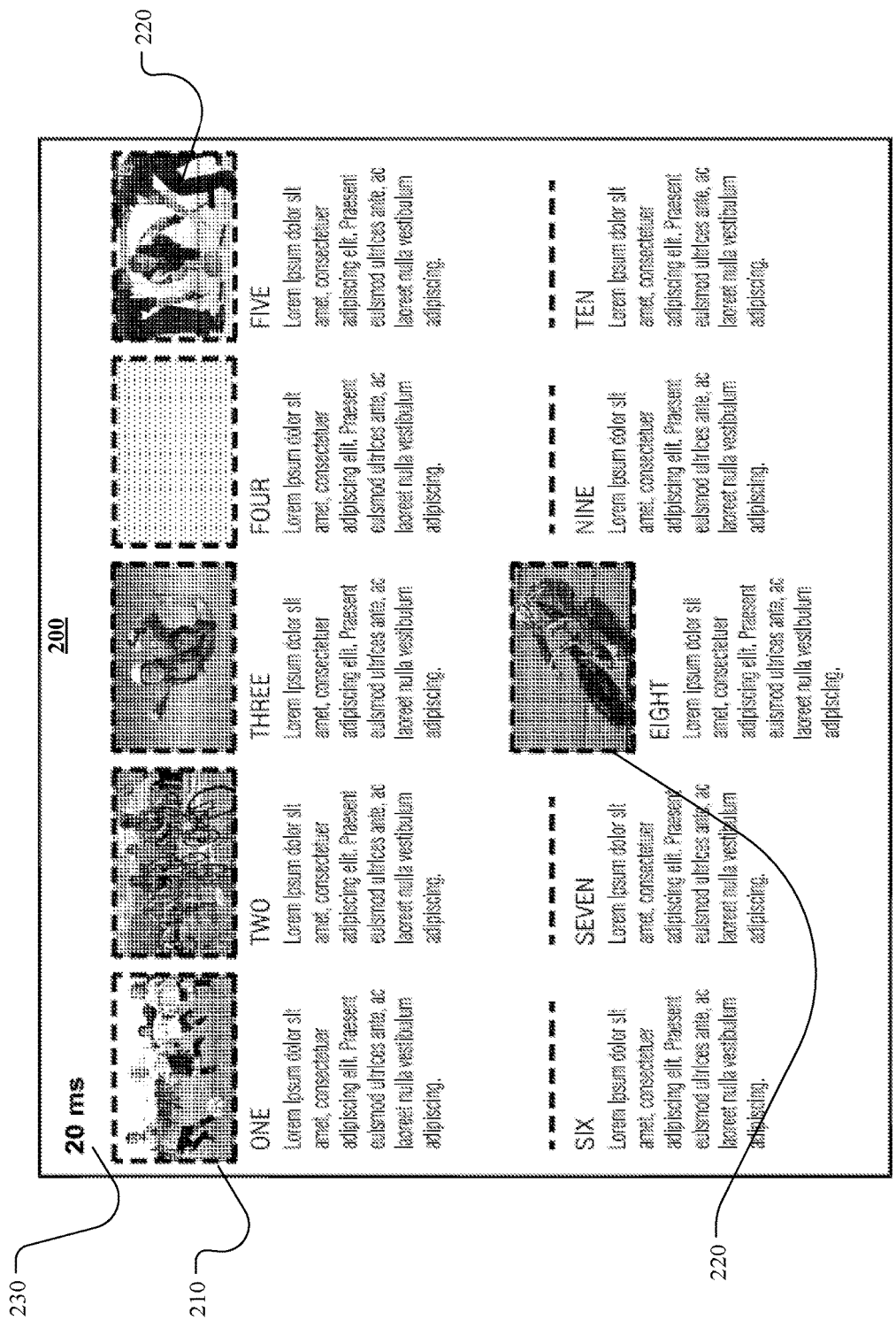
Figure 2D:
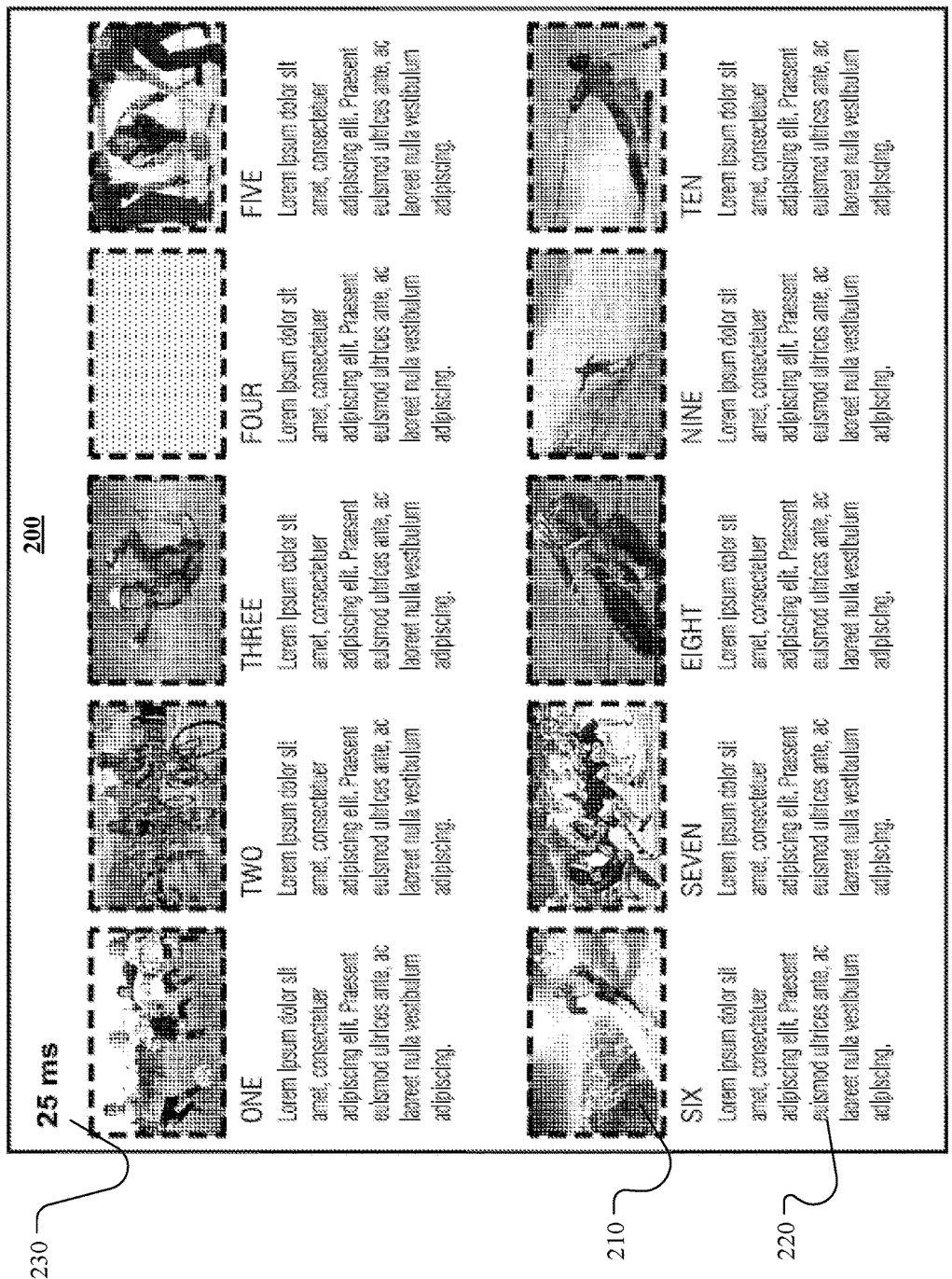

The above-described problem occurs in several different situations and is not limited to a search engine's typeahead feature. The above described problem may arise in any situation where a list, array, or other arrangement of items is retrieved from heterogeneous sources, but particularly detracts from the user experience when the first group of items comprises links that the user would like to select. FIGS. 2A-D illustrate the same problem on a webpage which displays content objects that load from various sources, the sources having various latencies. In this particular case, the content objects are photos. FIGS. 2A-D may be thought of as four screen shots taken over a short period of time (e.g., at 10 ms, 15 ms, 20 ms, and 25 ms). A user interface display screen 200 is shown, which may be, for example, a webpage on a web browser. The user interface 200 includes a photo region 210, and a text region 220. There is also a time element 230, which is for illustrative purposes only, to illustrate the time lapse between each screen shot. FIG. 2A illustrates how a user interface 200 may initially appear before the photo content objects have loaded. The photo content objects may be stored on several different databases, each database having a different latency. Thus, the photos may be retrieved and displayed at different times. It is important to note that the photo regions 210 are represented by a dashed line because there may be no space initially allocated to that region. This may be because the user interface only allocates space once the content object intended for that space is retrieved and displayed. FIG. 2B illustrates that after a brief delay (e.g., 5 ms), one or more photo regions 210 may grow in size to make room for photos. This may cause anything underneath the expanded photo region to be shifted down, in order to make room for the expanded photo region. Text region 220 has been pushed down to make room for the expanded photo region 210. FIG. 2C illustrates that after another brief delay (e.g., 5 more milliseconds), one or more additional photos may be retrieved and displayed on the screen in the photo regions 210. This may cause additional text regions 220 and photo regions 210 (appearing directly below a different photo region 210) to be pushed down on the user interface display screen 200. It is also important to note that the text below photo region 220 appears out of line with the text in the rest of the row in which photo region 220 resides. In addition to the shifting text and photos, text that appears out of line with other text on a web page may also detract from the user's experience with the web page. User experience is especially low if the text contains any links that the user wishes to select, either by clicking or tapping. For example, if a link appears at time 15 ms, the user may see the link and move his hand or cursor in an attempt to select the link. But by the time the user's hand or cursor has traveled to the link, the link may have shifted down. This can happen within a fraction of a second, faster than human reaction times. Thus, the user may inadvertently select a different link (in the different link has shifted to take the place of the original link), and inadvertently navigate to a web page he did not want to visit. FIG. 2D illustrates the final placement of the items on user interface display screen 200. An object of this disclosure is to remove any movement of items on user interface 200 without input from the user. In this way, items may remain where they are initially displayed.

The above described situations are only two examples of how a list, array, or other arrangement of items is retrieved from heterogeneous sources with varying latencies and the items are displayed on the screen at different times. This disclosure contemplates all situations where a UI component (e.g., web page, locally stored application, remotely stored application, etc.) is populated with groups of items from sources with varying latencies, and the items are displayed at different times, causing existing items to shift as additional items are displayed.

Figure 3A:
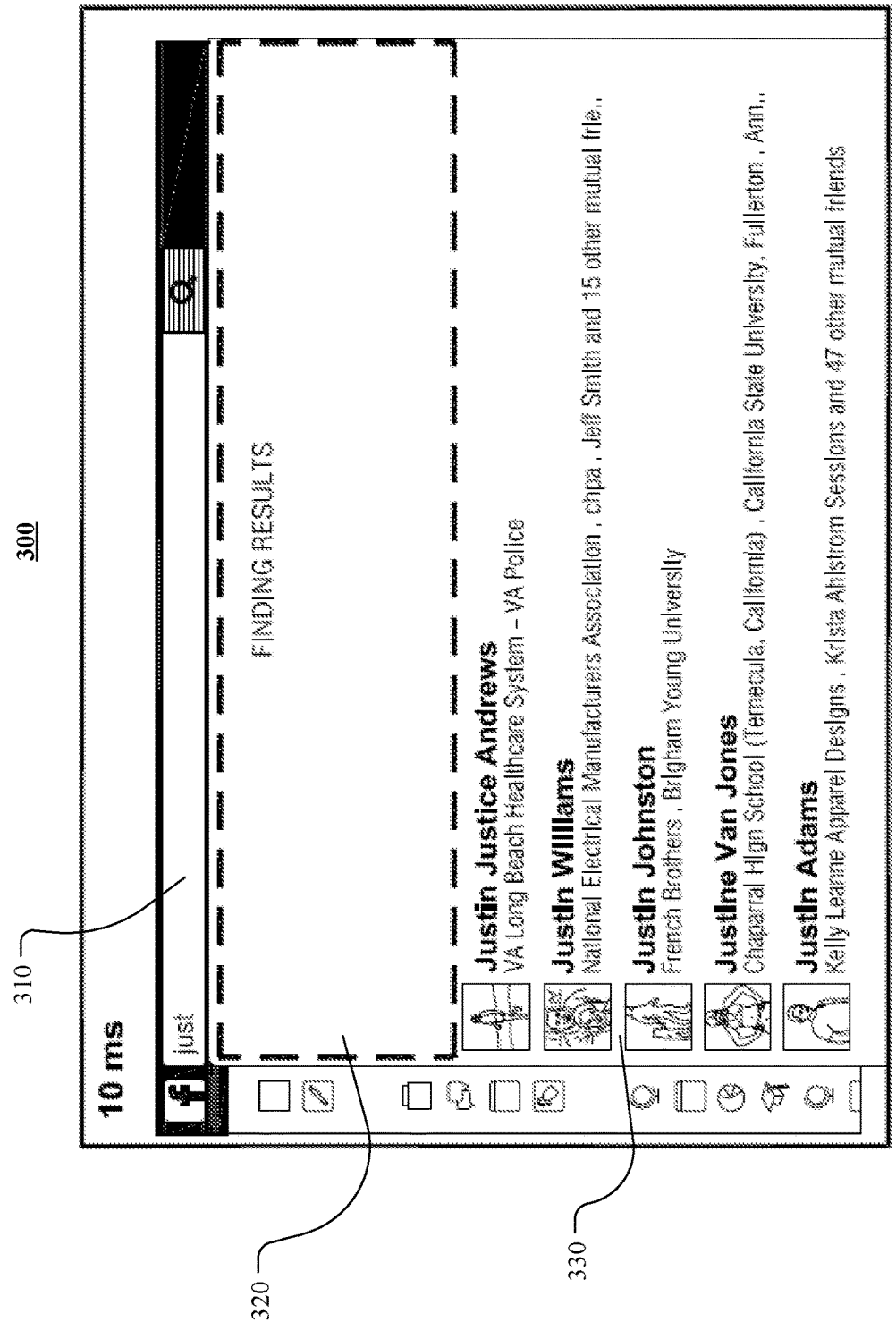
FIGS. 3A-D illustrate an example user interface with a pre-allocated region determined and displayed.
Figure 3B:
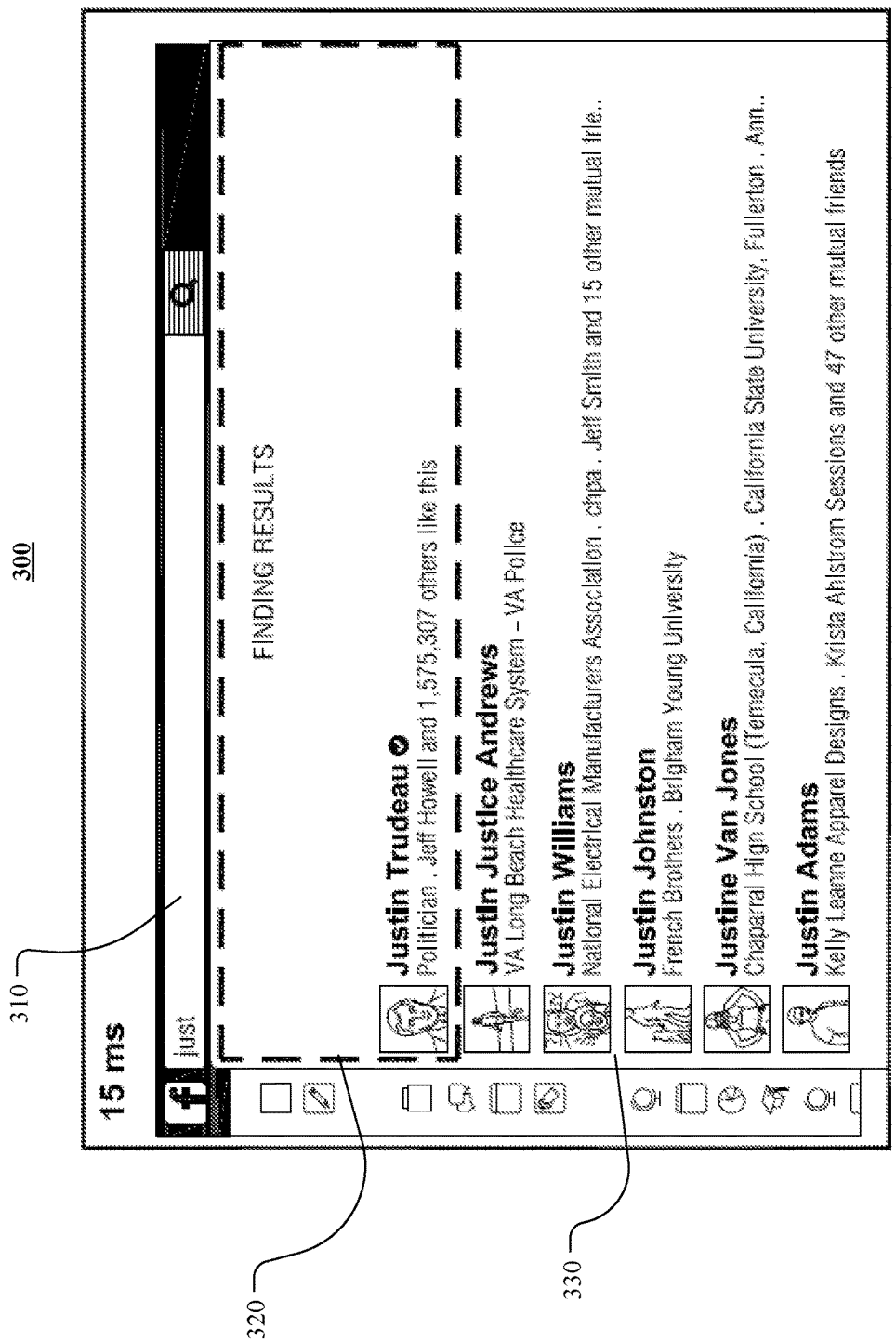
Figure 3C:
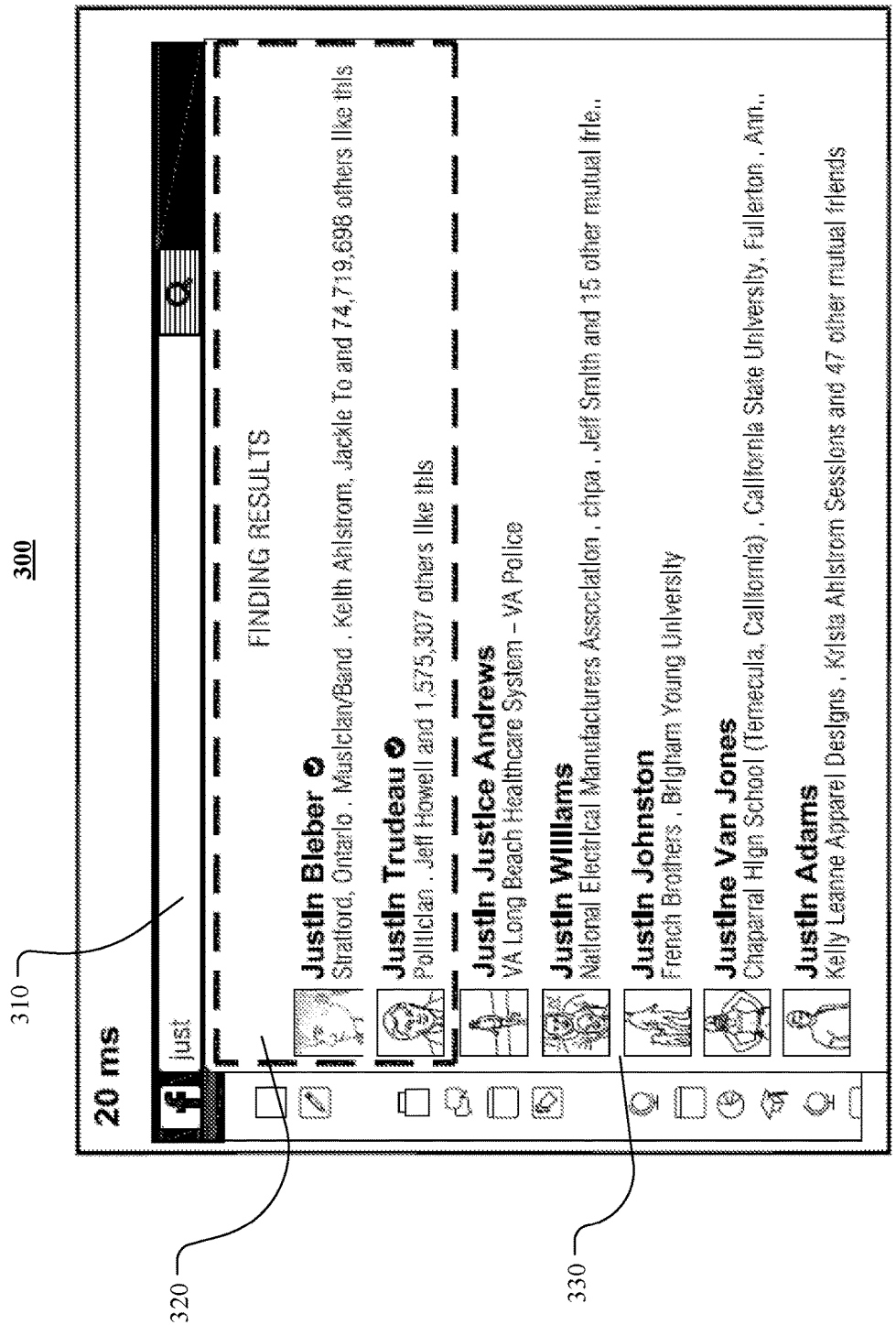
Figure 3D:
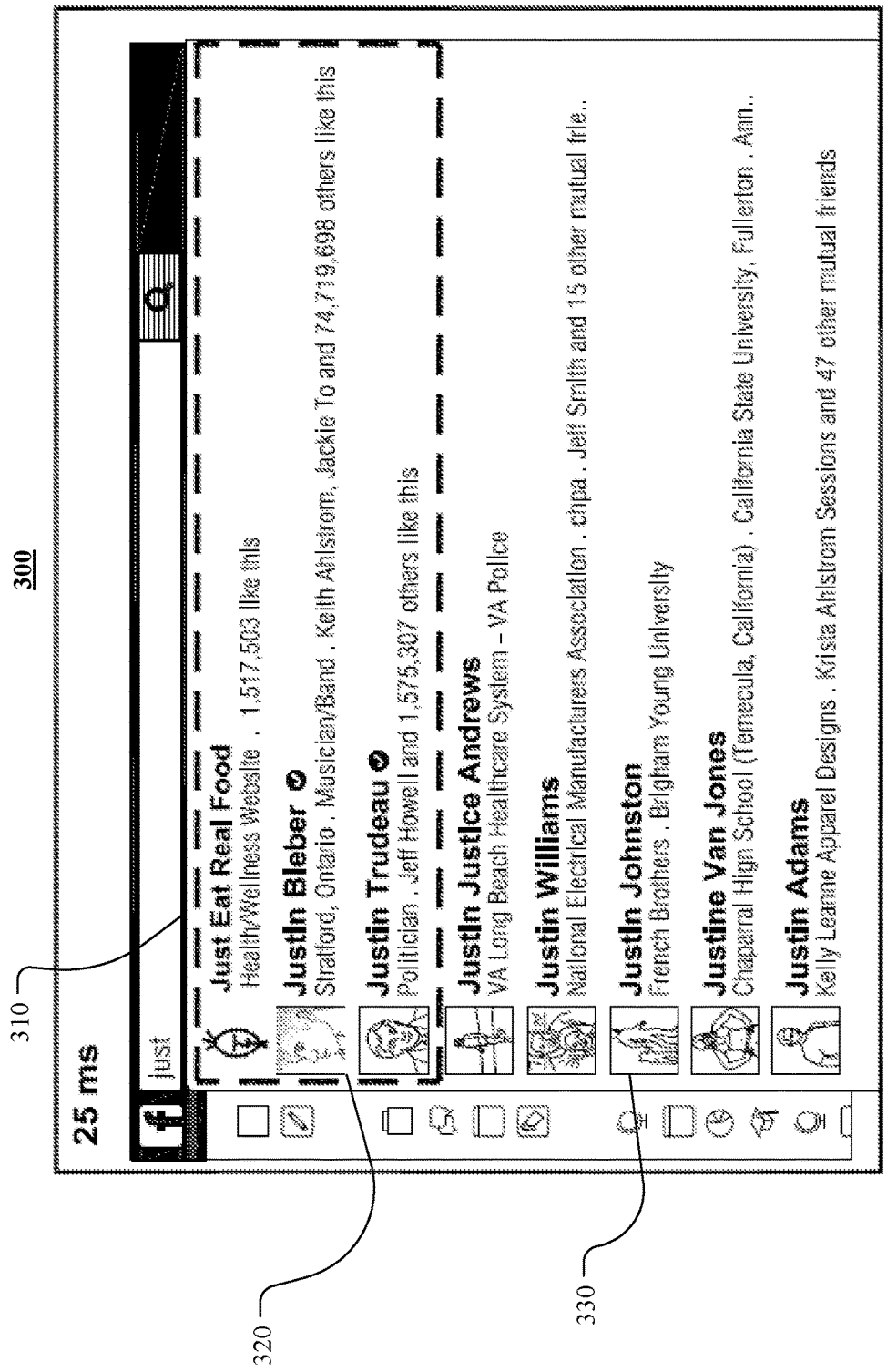

To overcome the above described problem, part of the user interface display screen may be pre-allocated for groups of entries that load more slowly but are intended to appear higher on the screen. Items that are displayed more quickly may be displayed outside the pre-allocated region. The items that appear quickly but are not intended to be displayed inside the pre-allocated region may appear beneath, above, or on either side of the pre-allocated region. In this way, items may remain where they are initially displayed. This is illustrated in FIGS. 3A-D. As shown in FIG. 3A, at 10 ms, which may be immediately after the user types the name "just" into the search bar 310, a pre-allocated region 320 has been allocated above a lower region 330. Lower region 330 may be populated first with items from the entities list group (e.g., "Justin Justice Andrews," "Justin Williams," "Justin Johnston," "Justine Van Jones" etc.), which come from a source with a shorter latency. However, instead of initially appearing right underneath the search bar on user interface display screen 300, items in the entities list group may appear beneath the pre-allocated region 320. It will be important to note that the size of the upper region 320 remains unchanged throughout FIGS. 3A-D. In particular embodiments, the pre-allocation region 320 may display some sort of indication that content will appear in that region in the near future, such as the statement "finding results" or some similar statement. FIG. 3B illustrates that after a brief delay, one or more items from the keywords list group may be retrieved and displayed in the pre-allocated region 320 (e.g., "Justin Trudeau"). The items that populate the pre-allocated region may be displayed as soon as they are retrieved, and they may be displayed in any order (e.g., from the top down or from the bottom up). FIG. 3C illustrates that after another brief delay, one or more additional items from the keywords list group may be retrieved and displayed in the pre-allocated region 320 (e.g., "Justin Bieber"). It is important to note that the size of the pre-allocated region 320 has not changed, and that the placement of the items in lower region 330 has not changed since they first appeared on user interface display screen 300. FIG. 3D illustrates what me be understood to be the final state of user interface display screen 300. Pre-allocated region 320 has been fully populated with items from the keywords list group (e.g., Just Eat Real Food, Justin Bieber, and Justin Trudeau). Items in the entities list group have remained unmoved since FIG. 3A at time 10 ms. Thus, all jerky movements of items after they have been displayed has been eliminated.

The terms "keywords list group" and "entities list group" are used as examples only and are not meant to be limiting in any way. These terms have been used to illustrate that search engines often search databases that have different latencies (e.g., some databases take longer to search than others), and items stored on these databases are retrieved and displayed at different times. Thus, the term "keywords list group" has been used as an example to refer to a group of items stored on a database that has a slow latency (e.g., it takes longer to search). Likewise, the term "entities list group" has been used as an example to refer to a group of items that are stored on a database that has a fast latency (e.g., it can be searched more quickly than the database storing the items in the keywords list group).

The above discussion of FIGS. 3A-D may be applied to any situation where items from two or more sources with varying latencies are retrieved and displayed on a screen at different times. The method is not limited to search engines with a typeahead feature. The solution may also be applied to the problem described in the discussion of FIGS. 2A-D, for example, by pre-allocating several regions for each of the photos that are retrieved from different sources and are displayed at different times.

The size of the pre-allocated region may be determined in a static or dynamic fashion. If static, the size could be determined based on the category of content, social networking information of the user, the particular server(s) from which the content is retrieved, the entity running the website onto which the content is loaded, or any other suitable factor. If dynamic, the pre-allocated region may change sizes depending on a variety of factors. A dynamic-sized pre-allocated region may change sizes between search queries or page loads (e.g., when a web page loads content from various sources), or a dynamic-sized pre-allocated region may change sizes during a single search query or a single page load. The over-arching concern may be to allocate an appropriate amount of space for the desired number of items in the keyword list group. In particular embodiments, the desired number of items in the keyword list group may vary depending on several factors. One example of a factor affecting the desired number of items in the keyword list group may be the number of keywords that are associated with the search query. Another example may be the complexity of the n-gram entered as a search query. As an example, if a user types "Is" into the search query field, the desired number of items in the keyword list group may be three: "isaac asimov;" "islanders vs. canadians;" and "islamic state." But if a user types a more complex n-gram, such as "pryzb," the desired number of items in the keywords list group may be two: "pryzbylewski;" and "joel pryzbilla." The goal may be to pre-allocate a region large enough to fit all three items in the keywords list group associated with the "Is" query, but to pre-allocate a smaller region for search queries such as "pryzb," which may return fewer items in the keyword list group. This way, pre-allocated region may be accurately sized so that it does not need to change size as more items are loaded into the pre-allocated region. Also, the entities list group may be displayed beneath the pre-allocated region prior to the display of the keywords list group inside the accurately sized pre-allocated region.

As shown above, one factor for determining the size of the pre-allocated region may be the complexity of the n-gram entered as the search query. Other factors may include trending topics (e.g., if many trending topics contain a particular n-gram and a user enters a search query for that n-gram, the pre-allocated space may be larger than search queries for other less common n-grams. This may occur independent of n-gram complexity); or whether the n-gram appears in the dictionary (n-grams appearing in the dictionary may be presumed to be more common, thus they may return more items in the keywords list group and require a larger pre-allocated region). Another way to determine the size of the pre-allocated region may be to create an index of many n-grams, sorted by the number of their occurrences in user posts and other content objects. Search queries for n-grams located on the index above a predetermined threshold level may require more pre-allocated space than n-grams below a predetermined threshold level. N-grams not appearing on the index may require no or very little pre-allocated space.

In particular embodiments, the size of the pre-allocated region may depend on information in a social graph associated with one or more users of an online social network. Items to be loaded into a pre-allocated region may be based on content objects or entities represented as nodes in a social graph. As an example and not by way of limitation, a user Alex may have liked a content object related to surfing, so an edge may be created that connects the a user node corresponding to Alex to a concept node called "surfing." The social networking system that hosts the online social network may keep a database of content objects or entities that are related to surfing, such as VANS, HARBOUR SURFBOARDS, Kelly Slater (a famous surfer), and the like. When Alex enters the string "Kell" into a search bar, the social-networking system may want to send Alex a reference to Kelly Slater or a product related to Kelly Slater to be displayed within the pre-allocated region, because such a reference may be categorized in the keywords list group. Thus, it may be necessary to allocate extra room in the pre-allocated region because Alex has an edge connecting his user node to the surfing concept node. If Alex did not have this connecting edge in his social graph, there may be no reason to push a reference related to Kelly Slater to Alex, and the pre-Allocated region may be smaller. As another example and not by way of limitation, Alex may have several friends who like, follow, or otherwise have an affinity for the hit NETFLIX documentary series "Making a Murderer." If Alex enters the string "Ma" into a search bar, the social-networking system may want to send Alex a reference to Making a Murderer, such as a sponsored link to pay for a Netflix subscription so that Alex may watch Making a Murderer. Such a reference may be categorized in the keywords list group and may be intended to be displayed in the pre-allocated region. A variety of other social networking information may help to determine the size of the pre-allocated region, including, but not limited to, a location of a user, a location of a user's friends, organizations a user belongs to, content objects a user has liked, posted, commented on, shared, or viewed, etc.

Figure 4:
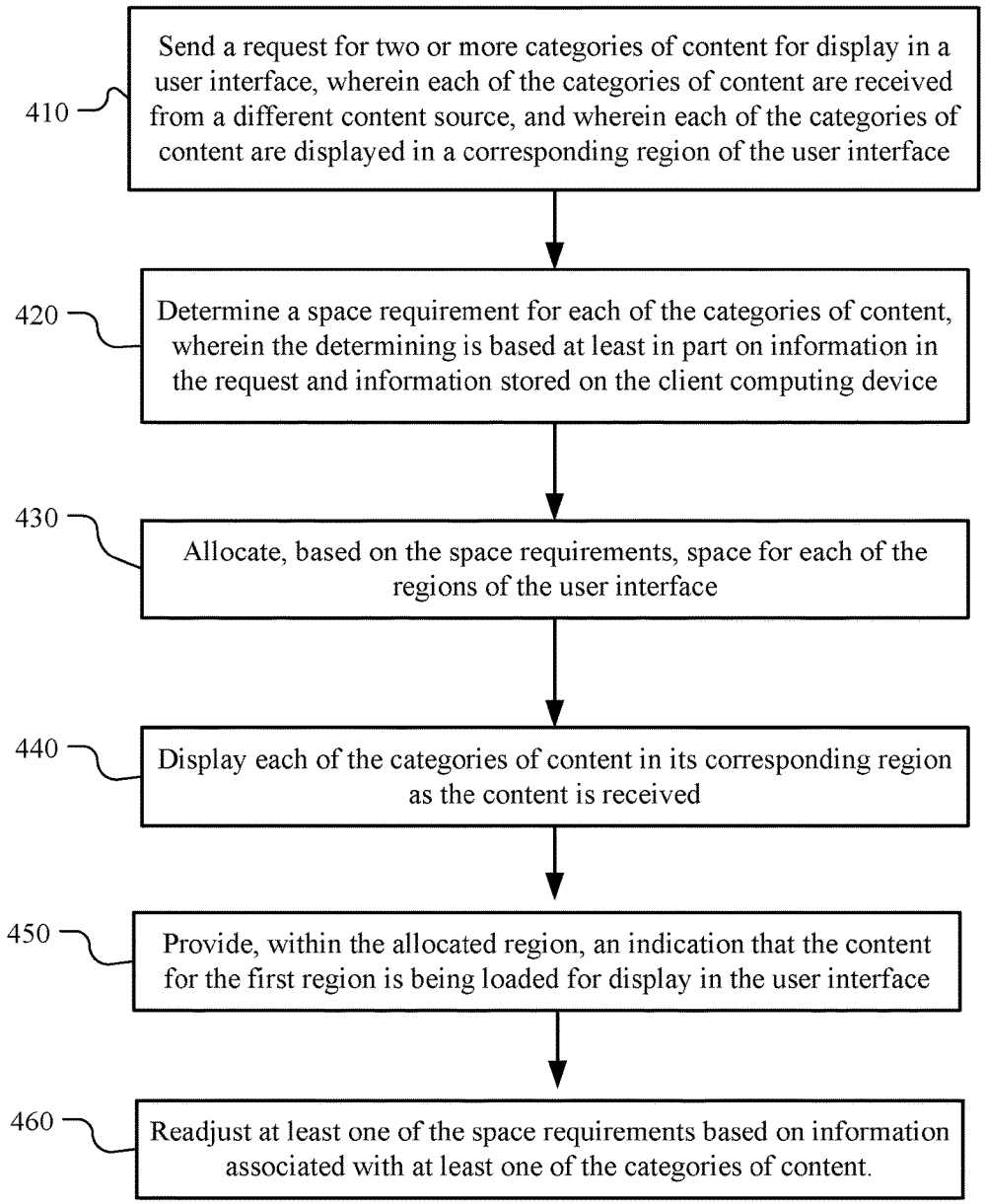
FIG. 4 illustrates an example method for allocating space on a display screen to properly load user interface components.

FIG. 4 illustrates an example method 400 for allocating space on a display screen to properly load user interface components by pre-allocating a region for items based on one or more machine learning algorithms. The method may begin at step 410, where a client computing device may send a request for two or more categories of content for display in a user interface, wherein each of the categories of content are received from a different content source, and wherein each of the categories of content are displayed in a corresponding region of the user interface. At step 420, the client computing device may determine a space requirement for each of the categories of content, wherein the determining is based at least in part on information in the request and information stored on the client computing device. Information stored on the client computing device may include system preferences, which may indicate various user defined or default settings that may relate to the size of the space requirement. At step 430, the client computing device may allocate, based on the space requirements, space for each of the regions of the user interface. At step 440, the client computing device may display each of the categories of content in its corresponding region as the content is received. At step 450, the client computing device may provide, within the allocated region, an indication that the content for the first region is being loaded for display in the user interface, (e.g., by displaying a statement such as "Finding Results"). At step 460, the client computing device may readjust at least one of the space requirements based on information associated with at least one of the categories of content. This readjustment may occur before or after one or more items has been retrieved and loaded onto the user interface. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for allocating space on a display screen to properly load user interface components by pre-allocating a region for items based on one or more machine learning algorithms including the particular steps of the method of FIG. 4, this disclosure contemplates any suitable method for allocating space on a display screen to properly load user interface components by pre-allocating a region for items based on one or more machine learning algorithms including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
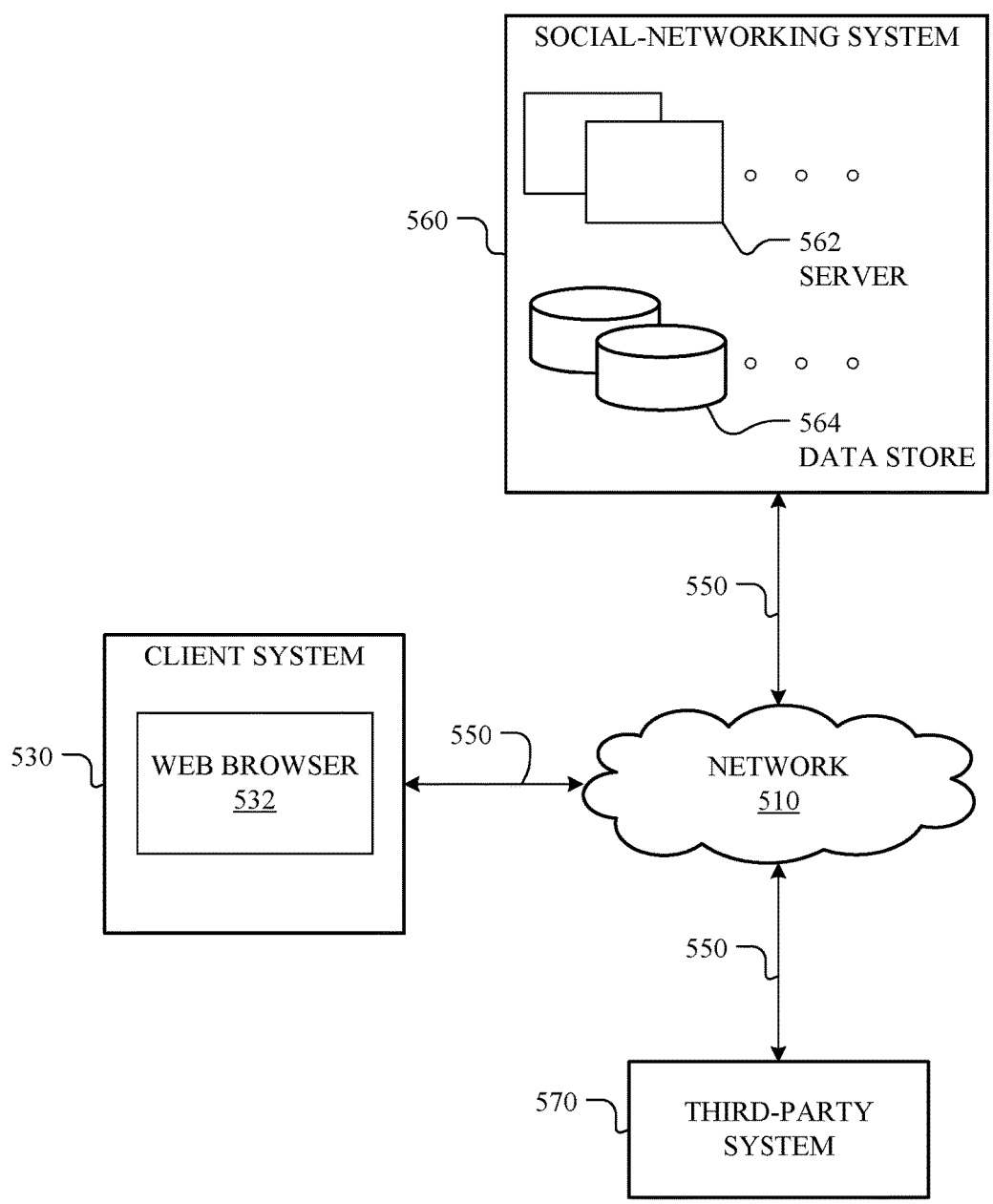
FIG. 5 illustrates an example network environment associated with a social-networking system.

FIG. 5 illustrates an example network environment 500 associated with a social-networking system. Network environment 500 includes a client system 530, a social-networking system 560, and a third-party system 570 connected to each other by a network 510. Although FIG. 5 illustrates a particular arrangement of client system 530, social-networking system 560, third-party system 570, and network 510, this disclosure contemplates any suitable arrangement of client system 530, social-networking system 560, third-party system 570, and network 510. As an example and not by way of limitation, two or more of client system 530, social-networking system 560, and third-party system 570 may be connected to each other directly, bypassing network 510. As another example, two or more of client system 530, social-networking system 560, and third-party system 570 may be physically or logically co-located with each other in whole or in part. Moreover, although FIG. 5 illustrates a particular number of client systems 530, social-networking systems 560, third-party systems 570, and networks 510, this disclosure contemplates any suitable number of client systems 530, social-networking systems 560, third-party systems 570, and networks 510. As an example and not by way of limitation, network environment 500 may include multiple client system 530, social-networking systems 560, third-party systems 570, and networks 510.

This disclosure contemplates any suitable network 510. As an example and not by way of limitation, one or more portions of network 510 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 510 may include one or more networks 510.

Links 550 may connect client system 530, social-networking system 560, and third-party system 570 to communication network 510 or to each other. This disclosure contemplates any suitable links 550. In particular embodiments, one or more links 550 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 550 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 550, or a combination of two or more such links 550. Links 550 need not necessarily be the same throughout network environment 500. One or more first links 550 may differ in one or more respects from one or more second links 550.

In particular embodiments, client system 530 may be an electronic device including hardware, software, or embedded logic components or a combination of two or more such components and capable of carrying out the appropriate functionalities implemented or supported by client system 530. As an example and not by way of limitation, a client system 530 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 530. A client system 530 may enable a network user at client system 530 to access network 510. A client system 530 may enable its user to communicate with other users at other client systems 530.

In particular embodiments, client system 530 may include a web browser 532, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 530 may enter a Uniform Resource Locator (URL) or other address directing the web browser 532 to a particular server (such as server 562, or a server associated with a third-party system 570), and the web browser 532 may generate a Hyper Text Transfer Protocol (HTTP) request and communicate the HTTP request to server. The server may accept the HTTP request and communicate to client system 530 one or more Hyper Text Markup Language (HTML) files responsive to the HTTP request. Client system 530 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 560 may be a network-addressable computing system that can host an online social network. Social-networking system 560 may generate, store, receive, and send social-networking data, such as, for example, user-profile data, concept-profile data, social-graph information, or other suitable data related to the online social network. Social-networking system 560 may be accessed by the other components of network environment 500 either directly or via network 510. As an example and not by way of limitation, client system 530 may access social-networking system 560 using a web browser 532, or a native application associated with social-networking system 560 (e.g., a mobile social-networking application, a messaging application, another suitable application, or any combination thereof) either directly or via network 510. In particular embodiments, social-networking system 560 may include one or more servers 562. Each server 562 may be a unitary server or a distributed server spanning multiple computers or multiple datacenters. Servers 562 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 562 may include hardware, software, or embedded logic components or a combination of two or more such components for carrying out the appropriate functionalities implemented or supported by server 562. In particular embodiments, social-networking system 560 may include one or more data stores 564. Data stores 564 may be used to store various types of information. In particular embodiments, the information stored in data stores 564 may be organized according to specific data structures. In particular embodiments, each data store 564 may be a relational, columnar, correlation, or other suitable database. Although this disclosure describes or illustrates particular types of databases, this disclosure contemplates any suitable types of databases. Particular embodiments may provide interfaces that enable a client system 530, a social-networking system 560, or a third-party system 570 to manage, retrieve, modify, add, or delete, the information stored in data store 564.

In particular embodiments, social-networking system 560 may store one or more social graphs in one or more data stores 564. In particular embodiments, a social graph may include multiple nodes—which may include multiple user nodes (each corresponding to a particular user) or multiple concept nodes (each corresponding to a particular concept)—and multiple edges connecting the nodes. Social-networking system 560 may provide users of the online social network the ability to communicate and interact with other users. In particular embodiments, users may join the online social network via social-networking system 560 and then add connections (e.g., relationships) to a number of other users of social-networking system 560 to whom they want to be connected. Herein, the term "friend" may refer to any other user of social-networking system 560 with whom a user has formed a connection, association, or relationship via social-networking system 560.

In particular embodiments, social-networking system 560 may provide users with the ability to take actions on various types of items or objects, supported by social-networking system 560. As an example and not by way of limitation, the items and objects may include groups or social networks to which users of social-networking system 560 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 560 or by an external system of third-party system 570, which is separate from social-networking system 560 and coupled to social-networking system 560 via a network 510.

In particular embodiments, social-networking system 560 may be capable of linking a variety of entities. As an example and not by way of limitation, social-networking system 560 may enable users to interact with each other as well as receive content from third-party systems 570 or other entities, or to allow users to interact with these entities through an application programming interfaces (API) or other communication channels.

In particular embodiments, a third-party system 570 may include one or more types of servers, one or more data stores, one or more interfaces, including but not limited to APIs, one or more web services, one or more content sources, one or more networks, or any other suitable components, e.g., that servers may communicate with. A third-party system 570 may be operated by a different entity from an entity operating social-networking system 560. In particular embodiments, however, social-networking system 560 and third-party systems 570 may operate in conjunction with each other to provide social-networking services to users of social-networking system 560 or third-party systems 570. In this sense, social-networking system 560 may provide a platform, or backbone, which other systems, such as third-party systems 570, may use to provide social-networking services and functionality to users across the Internet.

In particular embodiments, a third-party system 570 may include a third-party content object provider. A third-party content object provider may include one or more sources of content objects, which may be communicated to a client system 530. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 560 also includes user-generated content objects, which may enhance a user's interactions with social-networking system 560. User-generated content may include anything a user can add, upload, send, or "post" to social-networking system 560. As an example and not by way of limitation, a user communicates posts to social-networking system 560 from a client system 530. Posts may include data such as status updates or other textual data, location information, photos, videos, links, music or other similar data or media. Content may also be added to social-networking system 560 by a third-party through a "communication channel," such as a newsfeed or stream.

In particular embodiments, social-networking system 560 may include a variety of servers, sub-systems, programs, modules, logs, and data stores. In particular embodiments, social-networking system 560 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 560 may also include suitable components such as network interfaces, security mechanisms, load balancers, failover servers, management-and-network-operations consoles, other suitable components, or any suitable combination thereof. In particular embodiments, social-networking system 560 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 560 to one or more client systems 530 or one or more third-party system 570 via network 510. The web server may include a mail server or other messaging functionality for receiving and routing messages between social-networking system 560 and one or more client systems 530. An API-request server may allow a third-party system 570 to access information from social-networking system 560 by calling one or more APIs. An action logger may be used to receive communications from a web server about a user's actions on or off social-networking system 560. In conjunction with the action log, a third-party-content-object log may be maintained of user exposures to third-party-content objects. A notification controller may provide information regarding content objects to a client system 530. Information may be pushed to a client system 530 as notifications, or information may be pulled from client system 530 responsive to a request received from client system 530. Authorization servers may be used to enforce one or more privacy settings of the users of social-networking system 560. A privacy setting of a user determines how particular information associated with a user can be shared. The authorization server may allow users to opt in to or opt out of having their actions logged by social-networking system 560 or shared with other systems (e.g., third-party system 570), such as, for example, by setting appropriate privacy settings. Third-party-content-object stores may be used to store content objects received from third parties, such as a third-party system 570. Location stores may be used for storing location information received from client systems 530 associated with users. Advertisement-pricing modules may combine social information, the current time, location information, or other suitable information to provide relevant advertisements, in the form of notifications, to a user.

Figure 6:
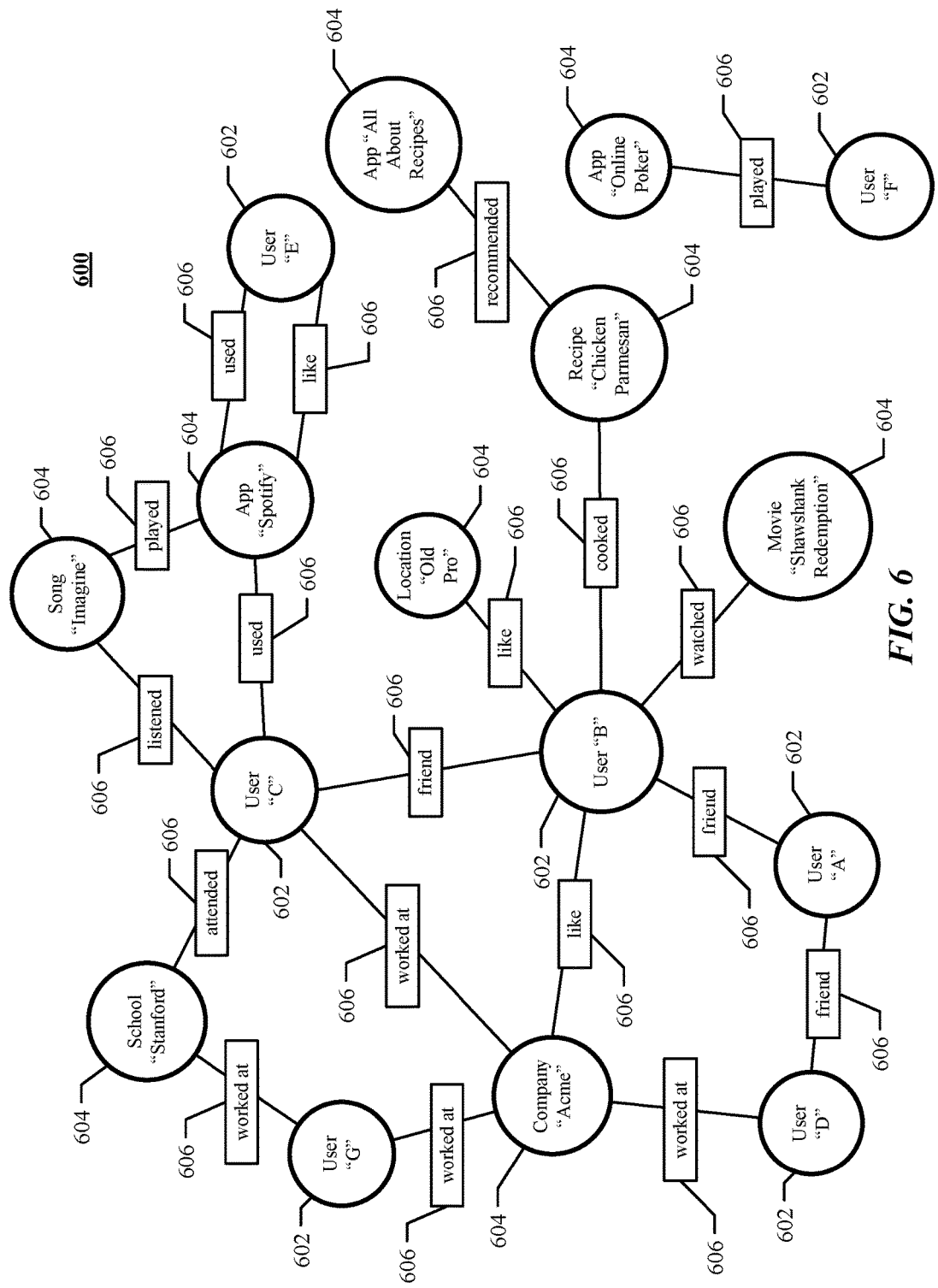
FIG. 6 illustrates an example social graph.

FIG. 6 illustrates example social graph 600. In particular embodiments, social-networking system 560 may store one or more social graphs 600 in one or more data stores. In particular embodiments, social graph 600 may include multiple nodes—which may include multiple user nodes 602 or multiple concept nodes 604—and multiple edges 606 connecting the nodes. Example social graph 600 illustrated in FIG. 6 is shown, for didactic purposes, in a two-dimensional visual map representation. In particular embodiments, a social-networking system 560, client system 530, or third-party system 570 may access social graph 600 and related social-graph information for suitable applications. The nodes and edges of social graph 600 may be stored as data objects, for example, in a data store (such as a social-graph database). Such a data store may include one or more searchable or queryable indexes of nodes or edges of social graph 600.

In particular embodiments, a user node 602 may correspond to a user of social-networking system 560. As an example and not by way of limitation, a user may be an individual (human user), an entity (e.g., an enterprise, business, or third-party application), or a group (e.g., of individuals or entities) that interacts or communicates with or over social-networking system 560. In particular embodiments, when a user registers for an account with social-networking system 560, social-networking system 560 may create a user node 602 corresponding to the user, and store the user node 602 in one or more data stores. Users and user nodes 602 described herein may, where appropriate, refer to registered users and user nodes 602 associated with registered users. In addition or as an alternative, users and user nodes 602 described herein may, where appropriate, refer to users that have not registered with social-networking system 560. In particular embodiments, a user node 602 may be associated with information provided by a user or information gathered by various systems, including social-networking system 560. As an example and not by way of limitation, a user may provide his or her name, profile picture, contact information, birth date, sex, marital status, family status, employment, education background, preferences, interests, or other demographic information. In particular embodiments, a user node 602 may be associated with one or more data objects corresponding to information associated with a user. In particular embodiments, a user node 602 may correspond to one or more webpages.

In particular embodiments, a concept node 604 may correspond to a concept. As an example and not by way of limitation, a concept may correspond to a place (such as, for example, a movie theater, restaurant, landmark, or city); a website (such as, for example, a website associated with social-network system 560 or a third-party website associated with a web-application server); an entity (such as, for example, a person, business, group, sports team, or celebrity); a resource (such as, for example, an audio file, video file, digital photo, text file, structured document, or application) which may be located within social-networking system 560 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 604 may be associated with information of a concept provided by a user or information gathered by various systems, including social-networking system 560. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 604 may be associated with one or more data objects corresponding to information associated with concept node 604. In particular embodiments, a concept node 604 may correspond to one or more webpages.

In particular embodiments, a node in social graph 600 may represent or be represented by a webpage (which may be referred to as a "profile page"). Profile pages may be hosted by or accessible to social-networking system 560. Profile pages may also be hosted on third-party websites associated with a third-party server 570. As an example and not by way of limitation, a profile page corresponding to a particular external webpage may be the particular external webpage and the profile page may correspond to a particular concept node 604. Profile pages may be viewable by all or a selected subset of other users. As an example and not by way of limitation, a user node 602 may have a corresponding user-profile page in which the corresponding user may add content, make declarations, or otherwise express himself or herself. As another example and not by way of limitation, a concept node 604 may have a corresponding concept-profile page in which one or more users may add content, make declarations, or express themselves, particularly in relation to the concept corresponding to concept node 604.

In particular embodiments, a concept node 604 may represent a third-party webpage or resource hosted by a third-party system 570. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 530 to send to social-networking system 560 a message indicating the user's action. In response to the message, social-networking system 560 may create an edge (e.g., a check-in-type edge) between a user node 602 corresponding to the user and a concept node 604 corresponding to the third-party webpage or resource and store edge 606 in one or more data stores.

In particular embodiments, a pair of nodes in social graph 600 may be connected to each other by one or more edges 606. An edge 606 connecting a pair of nodes may represent a relationship between the pair of nodes. In particular embodiments, an edge 606 may include or represent one or more data objects or attributes corresponding to the relationship between a pair of nodes. As an example and not by way of limitation, a first user may indicate that a second user is a "friend" of the first user. In response to this indication, social-networking system 560 may send a "friend request" to the second user. If the second user confirms the "friend request," social-networking system 560 may create an edge 606 connecting the first user's user node 602 to the second user's user node 602 in social graph 600 and store edge 606 as social-graph information in one or more of data stores 564. In the example of FIG. 6, social graph 600 includes an edge 606 indicating a friend relation between user nodes 602 of user "A" and user "B" and an edge indicating a friend relation between user nodes 602 of user "C" and user "B." Although this disclosure describes or illustrates particular edges 606 with particular attributes connecting particular user nodes 602, this disclosure contemplates any suitable edges 606 with any suitable attributes connecting user nodes 602. As an example and not by way of limitation, an edge 606 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 600 by one or more edges 606.

In particular embodiments, an edge 606 between a user node 602 and a concept node 604 may represent a particular action or activity performed by a user associated with user node 602 toward a concept associated with a concept node 604. As an example and not by way of limitation, as illustrated in FIG. 6, a user may "like," "attended," "played," "listened," "cooked," "worked at," or "watched" a concept, each of which may correspond to a edge type or subtype. A concept-profile page corresponding to a concept node 604 may include, for example, a selectable "check in" icon (such as, for example, a clickable "check in" icon) or a selectable "add to favorites" icon. Similarly, after a user clicks these icons, social-networking system 560 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 560 may create a "listened" edge 606 and a "used" edge (as illustrated in FIG. 6) between user nodes 602 corresponding to the user and concept nodes 604 corresponding to the song and application to indicate that the user listened to the song and used the application. Moreover, social-networking system 560 may create a "played" edge 606 (as illustrated in FIG. 6) between concept nodes 604 corresponding to the song and the application to indicate that the particular song was played by the particular application. In this case, "played" edge 606 corresponds to an action performed by an external application (SPOTIFY) on an external audio file (the song "Imagine"). Although this disclosure describes particular edges 606 with particular attributes connecting user nodes 602 and concept nodes 604, this disclosure contemplates any suitable edges 606 with any suitable attributes connecting user nodes 602 and concept nodes 604. Moreover, although this disclosure describes edges between a user node 602 and a concept node 604 representing a single relationship, this disclosure contemplates edges between a user node 602 and a concept node 604 representing one or more relationships. As an example and not by way of limitation, an edge 606 may represent both that a user likes and has used at a particular concept. Alternatively, another edge 606 may represent each type of relationship (or multiples of a single relationship) between a user node 602 and a concept node 604 (as illustrated in FIG. 6 between user node 602 for user "E" and concept node 604 for "SPOTIFY").

In particular embodiments, social-networking system 560 may create an edge 606 between a user node 602 and a concept node 604 in social graph 600. As an example and not by way of limitation, a user viewing a concept-profile page (such as, for example, by using a web browser or a special-purpose application hosted by the user's client system 530) may indicate that he or she likes the concept represented by the concept node 604 by clicking or selecting a "Like" icon, which may cause the user's client system 530 to send to social-networking system 560 a message indicating the user's liking of the concept associated with the concept-profile page. In response to the message, social-networking system 560 may create an edge 606 between user node 602 associated with the user and concept node 604, as illustrated by "like" edge 606 between the user and concept node 604. In particular embodiments, social-networking system 560 may store an edge 606 in one or more data stores. In particular embodiments, an edge 606 may be automatically formed by social-networking system 560 in response to a particular user action. As an example and not by way of limitation, if a first user uploads a picture, watches a movie, or listens to a song, an edge 606 may be formed between user node 602 corresponding to the first user and concept nodes 604 corresponding to those concepts. Although this disclosure describes forming particular edges 606 in particular manners, this disclosure contemplates forming any suitable edges 606 in any suitable manner.

In particular embodiments, social-networking system 560 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 570 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 560 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 560 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 560 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 560 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 560 may calculate a coefficient based on a user's actions. Social-networking system 560 may monitor such actions on the online social network, on a third-party system 570, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 560 may calculate a coefficient based on the user's actions with particular types of content. The content may be associated with the online social network, a third-party system 570, or another suitable system. The content may include users, profile pages, posts, news stories, headlines, instant messages, chat room conversations, emails, advertisements, pictures, video, music, other suitable objects, or any combination thereof. Social-networking system 560 may analyze a user's actions to determine whether one or more of the actions indicate an affinity for subject matter, content, other users, and so forth. As an example and not by way of limitation, if a user may make frequently posts content related to "coffee" or variants thereof, social-networking system 560 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 560 may calculate a coefficient based on the type of relationship between particular objects. Referencing the social graph 600, social-networking system 560 may analyze the number and/or type of edges 606 connecting particular user nodes 602 and concept nodes 604 when calculating a coefficient. As an example and not by way of limitation, user nodes 602 that are connected by a spouse-type edge (representing that the two users are married) may be assigned a higher coefficient than a user nodes 602 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 560 may determine that the user has a higher coefficient with respect to the first photo than the second photo because having a tagged-in-type relationship with content may be assigned a higher weight and/or rating than having a like-type relationship with content. In particular embodiments, social-networking system 560 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 560 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 600. As an example and not by way of limitation, social-graph entities that are closer in the social graph 600 (e.g., fewer degrees of separation) may have a higher coefficient than entities that are further apart in the social graph 600.

In particular embodiments, social-networking system 560 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 530 of the user). A first user may be more interested in other users or concepts that are closer to the first user. As an example and not by way of limitation, if a user is one mile from an airport and two miles from a gas station, social-networking system 560 may determine that the user has a higher coefficient for the airport than the gas station based on the proximity of the airport to the user.

In particular embodiments, social-networking system 560 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 560 may provide information that is relevant to user's interests and current circumstances, increasing the likelihood that they will find such information of interest. In particular embodiments, social-networking system 560 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 560 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 560 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 570 (e.g., via an API or other communication channel), or from another suitable system. In response to the request, social-networking system 560 may calculate the coefficient (or access the coefficient information if it has previously been calculated and stored). In particular embodiments, social-networking system 560 may measure an affinity with respect to a particular process. Different processes (both internal and external to the online social network) may request a coefficient for a particular object or set of objects. Social-networking system 560 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978265, filed 23 Dec. 2010, and U.S. patent application Ser. No. 13/632869, filed 1 Oct. 2012, each of which is incorporated by reference.

Figure 7:
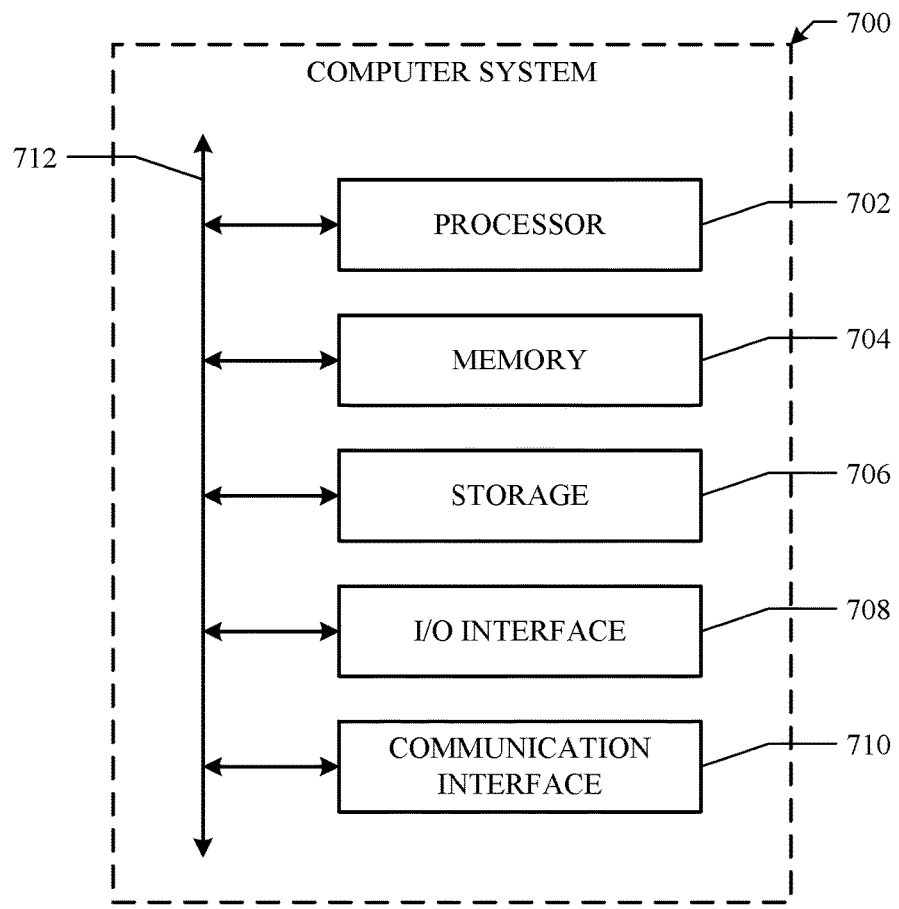
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
    by a client computing device, sending a request for content from two or more categories of content for display in a user interface, wherein:
        content from a first category of content of the two or more categories is received after a first delay;
        content from a second category of content of the two or more categories is received after a second delay that is longer than the first delay; and
        the content from the second category is displayed adjacent to the content from the first category;
    by the client computing device, determining a space requirement for the content from the second category, wherein the determining is based at least in part on information in the request and information stored on the client computing device; and
    by the client computing device, allocating, based on the space requirements, space for the content from the second category; and
    by the client computing device, displaying content from the first category simultaneously with displaying a substantially blank space that corresponds to the content from the second category before the content from the second category is received.

2. The method of claim 1, wherein each of the categories of content is displayed in response to a search query.

3. The method of claim 2, wherein the request and the determined space requirement are updated as each successive character of the search query is received by the client computing device.

4. The method of claim 2, wherein the space requirement is determined based on the complexity of the search query, wherein as the complexity of the search query increases the space requirement decreases.

5. The method of claim 2, wherein the determining of the space requirement for the content from the second category further comprises:
    extracting one or more n-grams from one or more content objects on an online social network;
    sorting the n-grams by their frequency on the online social network; and
    allocating additional space if the search query matches an n-gram with a frequency above a predetermined threshold value.

6. The method of claim 1, wherein the substantially blank space comprises an indication that a content object is being loaded for display in the user interface.

7. The method of claim 1, wherein the first category of content comprises one or more content objects, each content object being represented by a node in a social graph that is associated with a social-networking system, wherein each node is connected by one or more edges to a user node; and the second category of content comprises sponsored content objects.

8. The method of claim 1, further comprising readjusting the space requirement based on information associated with at least one of the categories of content.

9. The method of claim 1, wherein the determining of the space requirement for the content from the second category further comprises determining a quantity of items within at least one of the categories of content.

10. The method of claim 1, further comprising:
determining whether the request comprises a request for one or more trending topics; and
if the request comprises a request for one or more trending topics, allocating additional space to at least one region of the user interface.

11. One or more computer-readable non-transitory storage media embodying software that is operable when executed to:
send a request for content from two or more categories of content for display in a user interface, wherein:
content from a first category of content of the two or more categories is received after a first delay;
content from a second category of content of the two or more categories is received after a second delay that is longer than the first delay; and
the content from the second category is displayed adjacent to the content from the first category;
determine a space requirement for the content from the second category, wherein the determining is based at least in part on information in the request and information stored on the client computing device; and
allocate, based on the space requirement, space for the content from the second category; and
display the content from the first category simultaneously with a blank space that corresponds to the content from the second category before the content from the second category is received.

12. The media of claim 11, wherein the space requirement is determined based on the complexity of the search query, wherein as the complexity of the search query increases the space requirement decreases.

13. The media of claim 12, wherein the request and the determined space requirement are updated as each successive character of the search query is received by the client computing device.

14. The media of claim 12, wherein the space requirement is determined based on the complexity of the search query, wherein as the complexity of the search query increases the space requirement decreases.

15. The media of claim 12, wherein the software is further operable when executed to:
extract one or more n-grams from one or more content objects on an online social network;
sort the n-grams by their frequency on the online social network; and
allocate additional space if the search query matches an n-gram with a frequency above a predetermined threshold value.

16. A system comprising: one or more processors; and a memory coupled to the processors comprising instructions executable by the processors, the processors being operable when executing the instructions to:
send a request for content from two or more categories of content for display in a user interface, wherein:
content from a first category of content of the two or more categories is received after a first delay;
content from a second category of content of the two or more categories is received after a second delay that is longer than the first delay; and
the content from the second category is displayed adjacent to the content from the first category;
determine a space requirement for the content from the second category, wherein the determining is based at least in part on information in the request and information stored on the client computing device; and
allocate, based on the space requirement, space for the content from the second category; and
display the content from the first category simultaneously with a blank space that corresponds to the content from the second category before the content from the second category is received.

17. The system of claim 16, wherein each of the categories of content is displayed in response to a search query.

18. The system of claim 17, wherein the processors are further operable when executing the instructions to:
extract one or more n-grams from one or more content objects on an online social network;
sort the n-grams by their frequency on the online social network; and
allocate additional space if the search query matches an n-gram with a frequency above a predetermined threshold value.

19. The system of claim 16, wherein the processors are further operable when executing the instructions to:
determine whether the request comprises a request for one or more trending topics; and
if the request comprises a request for one or more trending topics, allocate additional space to at least one of the allocated regions of the user interface.

* * * * *